(12) United States Patent
Yamamura et al.

(10) Patent No.: US 7,083,224 B2
(45) Date of Patent: Aug. 1, 2006

(54) FRONT FENDER STRUCTURE (75) Inventors: Takuya Yamamura, Utsunomiya (JP); Ko Ishikawa, Sakura (JP); Yasuto Shigematsu, Utsunomiya (JP); Tadashi Miyashita, Shioya-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/166,557

(22) Filed: Jun. 24, 2005

(65) Prior Publication Data

US 2006/0001293 A1 Jan. 5, 2006

(30) Foreign Application Priority Data

Jun. 30, 2004 (JP) .............................. 2004-194415

(51) Int. Cl.
*B62D 25/04* (2006.01)
(52) U.S. Cl. ............ 296/198; 296/203.02; 296/193.06; 296/187.09
(58) Field of Classification Search ................ 296/198, 296/203.01, 203, 203.03, 187.09, 187.12, 296/193.06, 193.09; 280/850
See application file for complete search history.

(56) References Cited

U.S. PATENT DOCUMENTS

| 5,052,742 A * | 10/1991 | Akoshima et al. .......... 296/192 |
| 6,209,950 B1 * | 4/2001 | Hanyu .................... 296/203.02 |
| 6,332,642 B1 * | 12/2001 | Hanyu .................... 296/203.02 |
| 6,409,255 B1 * | 6/2002 | Tilsner et al. ............... 296/198 |
| 6,805,400 B1 * | 10/2004 | Bruderick et al. ..... 296/193.09 |
| 6,880,883 B1 * | 4/2005 | Decker et al. ......... 296/203.02 |
| 2005/0077755 A1 * | 4/2005 | Yasui .................... 296/203.02 |

FOREIGN PATENT DOCUMENTS

JP         2000-006847         1/2000

* cited by examiner

*Primary Examiner*—D. Glenn Dayoan
*Assistant Examiner*—Greg Blankenship
(74) *Attorney, Agent, or Firm*—Rankin, Hill, Porter & Clark LLP (57) ABSTRACT A front fender structure includes an enclosure extension which extends from an enclosure extending vertically between a fender panel and an outer panel which forms a front pillar toward the upper part of a wheel arch edge portion of the fender panel; and a fender panel surface reinforcement portion which is provided on the enclosure extension along the inner surface of the fender panel.

8 Claims, 9 Drawing Sheets

FIG. 10

FRONT FENDER STRUCTURE

BACKGROUND OF THE INVENTION

1. Field of the Invention

The present invention relates to a front fender structure capable of improving the planar rigidity of a fender panel.

Priority is claimed on Japanese Patent Application No. 2004-194415, filed Jun. 30, 2004, the content of which is incorporated herein by reference.

2. Description of Related Art

The front fender structure described below has been proposed in order to attempt to prevent the strength of the lower part of the fender panel from being reduced and to make the fender panel narrow. That is, the structure is such that a bracket is elongated from the lower part of an enclosure plate integrated with the rear part of a fender panel by welding toward the lower part of the wheel arch edge portion of the fender panel, and the bracket is caused to function as a beam member by welding the tip end of the bracket to the lower part of the wheel arch edge portion of the fender panel (for example, refer to Japanese Unexamined Patent Application, First Publication No. 2000-6847).

The front fender structure gives reinforcement for the purpose of preventing the strength in the lower part of the fender panel from being reduced and simultaneously attempting to make the fender panel narrow. Therefore, the front fender structure does not contribute to the planar rigidity in the vicinity of the upper portion of the wheel arch edge portion which is roughly flat in the fender panel and has a wide area. The reason why is that, conventionally, the plate thickness of the fender panel is thick and the planar rigidity of the fender panel is secured by the fender panel itself even if there is a portion which is roughly flat and has a wide area in the fender panel.

In recent years, for the purpose of making the vehicle weight lighter, it has been highly desired that the plate thickness of a fender panel is made as thin as possible. However, if the plate thickness of the fender panel is made thin, it is impossible to secure the planar rigidity of the rear part at the upper portion of the wheel arch edge portion, which is roughly flat and has a wide area, of the fender panel. Therefore, if the portion is pressed by a person by hand, the portion is easily deformed (so-called temporary denting). Although the deformation can be reversed if pressing by hand is stopped, the sense of luxuriousness of a vehicle is lost or spoiled.

SUMMARY OF THE INVENTION

It is therefore an object of the invention to provide a front fender structure capable of securing planar rigidity of the rear part at the upper portion of the wheel arch edge portion, which is roughly flat and has a wide area, of the fender panel even if the plate thickness of the fender panel is made thin.

In order to achieve the object of the present invention, a front fender structure according to the invention includes an enclosure extending vertically and being disposed between a fender panel and an outer panel that forms a front pillar, an enclosure extension which extends from the enclosure toward the upper part of a wheel arch edge portion of the fender panel; and a fender panel surface reinforcement portion which is provided on the enclosure extension along the inner surface of the fender panel.

According to the present invention, an enclosure extension is extended from the enclosure toward the upper portion of the wheel arch edge portion of the fender panel and the planar reinforcement portion of fender panel is provided on the enclosure extension along the inner surface of the fender panel, and if the rear part of the upper portion of the wheel arch edge portion, which is roughly flat and has a wide area, of the fender panel is pressed by a person by hand, the portion is brought into contact with the planar reinforcement portion of the fender panel along the inner surface of the fender panel. Therefore, deformation of the rear part at the upper portion of the wheel arch edge portion can be prevented. As a result, even if the plate thickness of the fender panel is made thin, it is possible to secure the planar rigidity of the rear part at the upper portion of the wheel arch edge portion, which is roughly flat and has a wide area, of the fender panel.

In the present invention, it is preferable that the front fender structure further include an inner fender panel which is fastened to an extended tip end portion of the enclosure extension along with the fender panel.

According to the present invention, since the inner fender panel is fastened to the extended tip end portion of the enclosure extension along with the fender panel, it is possible to collectively fasten to the extended tip end portion of the enclosure extension, the fender panel and the inner fender panel at once.

In the present invention, it is preferable that the front fender structure further includes an engagement portion which is engaged with the extended tip end portion of the enclosure extension and a flange portion of the fender panel.

According to the present invention, since it is provided with the engagement portion which is engaged with the extended tip end portion of the enclosure extension and the flange portion of the fender panel, the extended tip end portion of the enclosure extension is positioned with respect to the flange portion of the fender panel. Therefore, it is possible to easily fasten the inner fender panel after the positioning. Accordingly, it is possible to further easily fasten to the extended tip end portion of the enclosure extension, the fender panel and the inner fender panel.

In the present invention, it is preferable that a fitting hole is formed at the flange portion of the fender panel as the engagement portion; an attaching portion is formed at the extended tip end portion of the enclosure extension; the attaching portion includes a boss portion fitted in the fitting hole as the engagement portion; and the inner fender panel is fastened to the attaching portion.

According to the present invention, since the boss portion of the attaching portion which is formed at the extended tip end portion of the enclosure extension is fitted in the fitting hole of the fender panel, the extended tip end portion of the enclosure extension is positioned with respect to the fender panel, and the boss portion is exposed from the fender panel. Accordingly, the inner fender panel can be easily fastened to the attaching portion which has the boss portion. Therefore, it is possible to further easily fasten the extended tip end portion of the enclosure extension, the fender panel and the inner fender panel. Furthermore, by adjusting the height of the boss portion, it is possible to easily engage the boss portion with the other components such as the inner fender panel without varying the shape, etc., of the fender panel.

DETAILED DESCRIPTION OF THE INVENTION

A description is given below of a front fender structure according to one embodiment of the invention with reference to the drawings. In the description, the terms "front" and "rear" correspond to the front part and the rear part of a vehicle.

Figure 1:
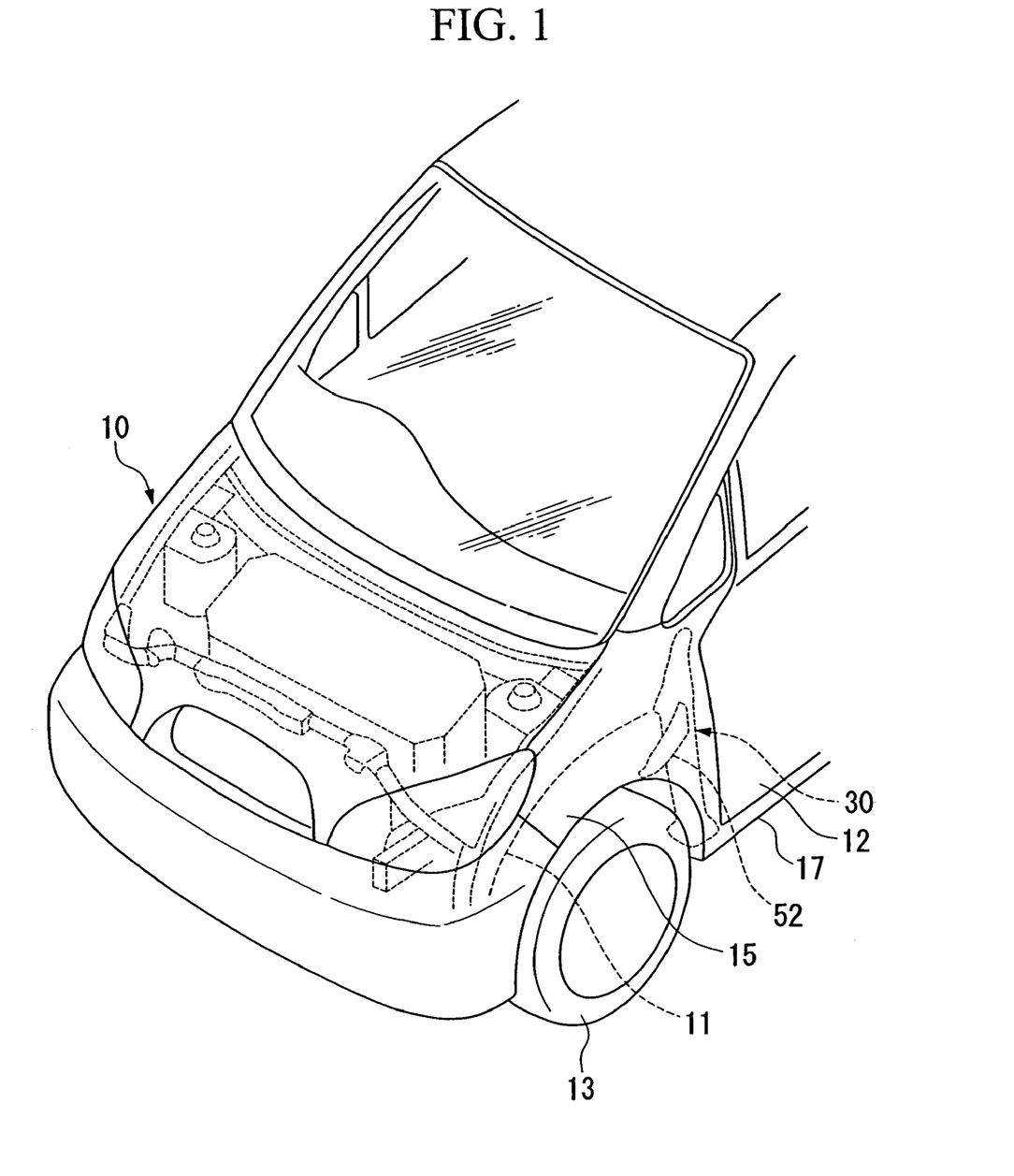
FIG. 1 is a perspective view showing the front part of a vehicle which is applied a front fender structure of the present invention.

FIG. 1 shows the front part of a vehicle to which a front fender structure according to the embodiment is applied. A front fender panel 15 is provided at the outer side in the vehicle width direction of a wheel housing member 11 extending roughly in the forward and rearward direction (longitudinal direction of the vehicle) at the front part of a vehicle and forward from a front door 12. The front fender panel 15 is made of a steel plate, and is provided so as to cover a front wheel 13 from its upper side.

Figure 2:
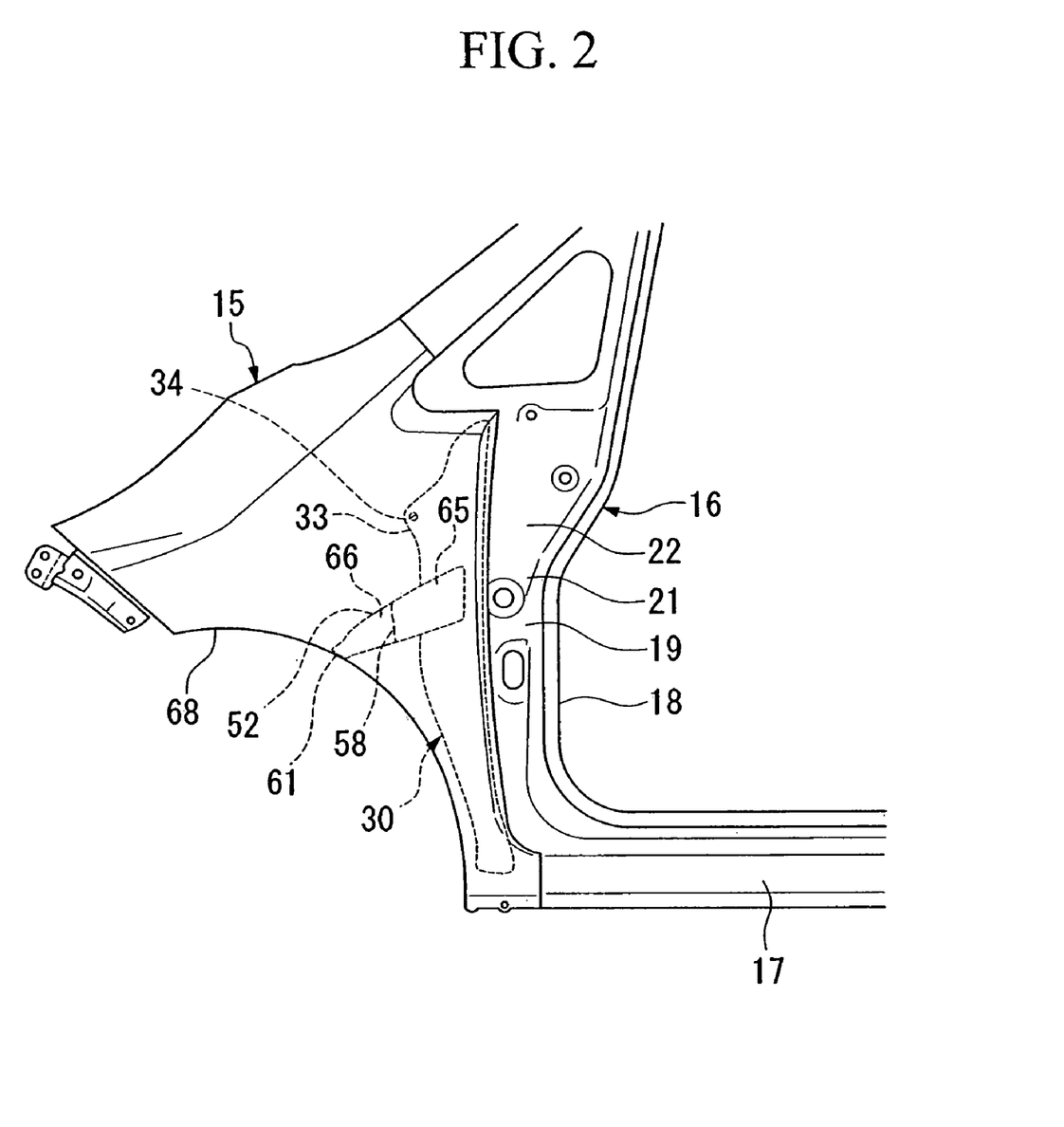
FIG. 2 is a side view of the front fender structure of the present invention.

FIG. 2 shows the vicinity of the fender panel 15 with the front door 12 omitted. An outer panel 16 made of a steel plate is provided inside the fender panel 15 in the vehicle width direction. The outer panel 16 forms the outer side portion of a side sill 17, which is a framework member of the vehicle, extending in the longitudinal direction at the lower part of the side portion of the vehicle 10, and the outer side portion of a front pillar 19, which is also a framework member of the vehicle, extending in the vertical direction at the front side of a door opening 18 of the front door 12.

Figure 3:
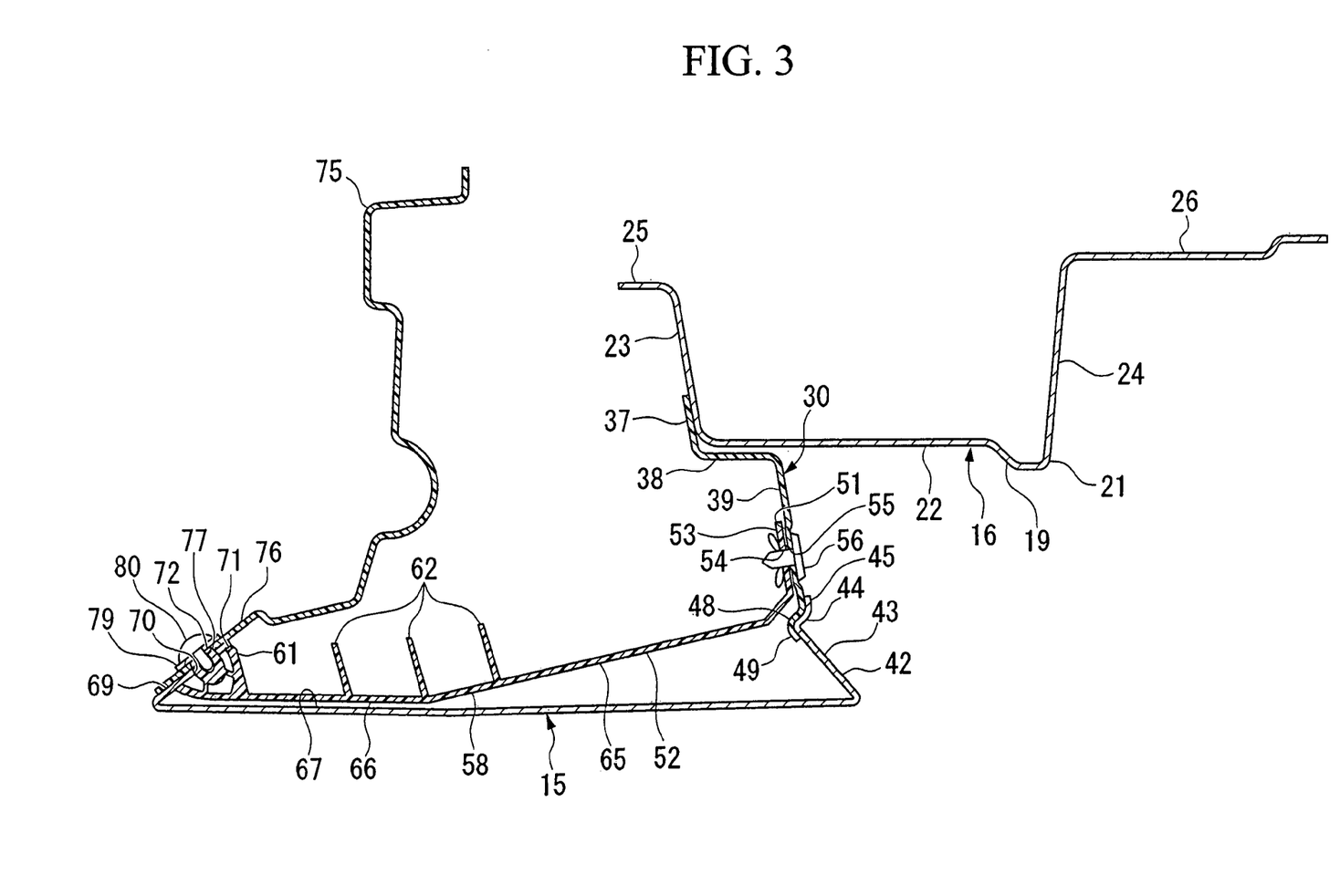
FIG. 3 is a sectional view of the front fender structure according to the invention.

As shown in FIG. 3, a pillar structure 21 that forms the front pillar 19 of the outer panel 16 includes a side plate portion 22, a front plate portion 23, a rear plate portion 24, a front flange portion 25, and a rearward extension plate portion 26. That is, the pillar structure 21 presents a so-called hat-shaped section. The side plate portion 22 is located at the outer side in the vehicle width direction and is made orthogonal to the vehicle width direction, and also extends in the vertical direction. The front plate portion 23 is folded inward in the vehicle width direction from one end edge in the longitudinal direction of the side plate portion 22. The rear plate portion 24 is also folded inward in the vehicle width direction from the other end edges in the longitudinal direction of the side plate portion 22. The front flange portion 25 is folded forward from the end edge portion of the front plate portion 23 located at the opposite side of the side plate portion 22. The rearward extension plate portion 26 is folded rearward from the end edge portion of the rear plate portion 24 located at the opposite side of the side plate portion 22. The pillar structure 21 forms the front pillar 19 of a closed section structure together with an inner panel (not shown) having a hat-shaped section similar thereto.

The rear end edge portion of the fender panel 15 disposed at the outer side in the vehicle width direction of the outer panel 16 is positioned at the side plate portion 22 of the pillar structure 21 of the outer panel 16 and is disposed with clearance secured in the vehicle width direction.

Figure 4:
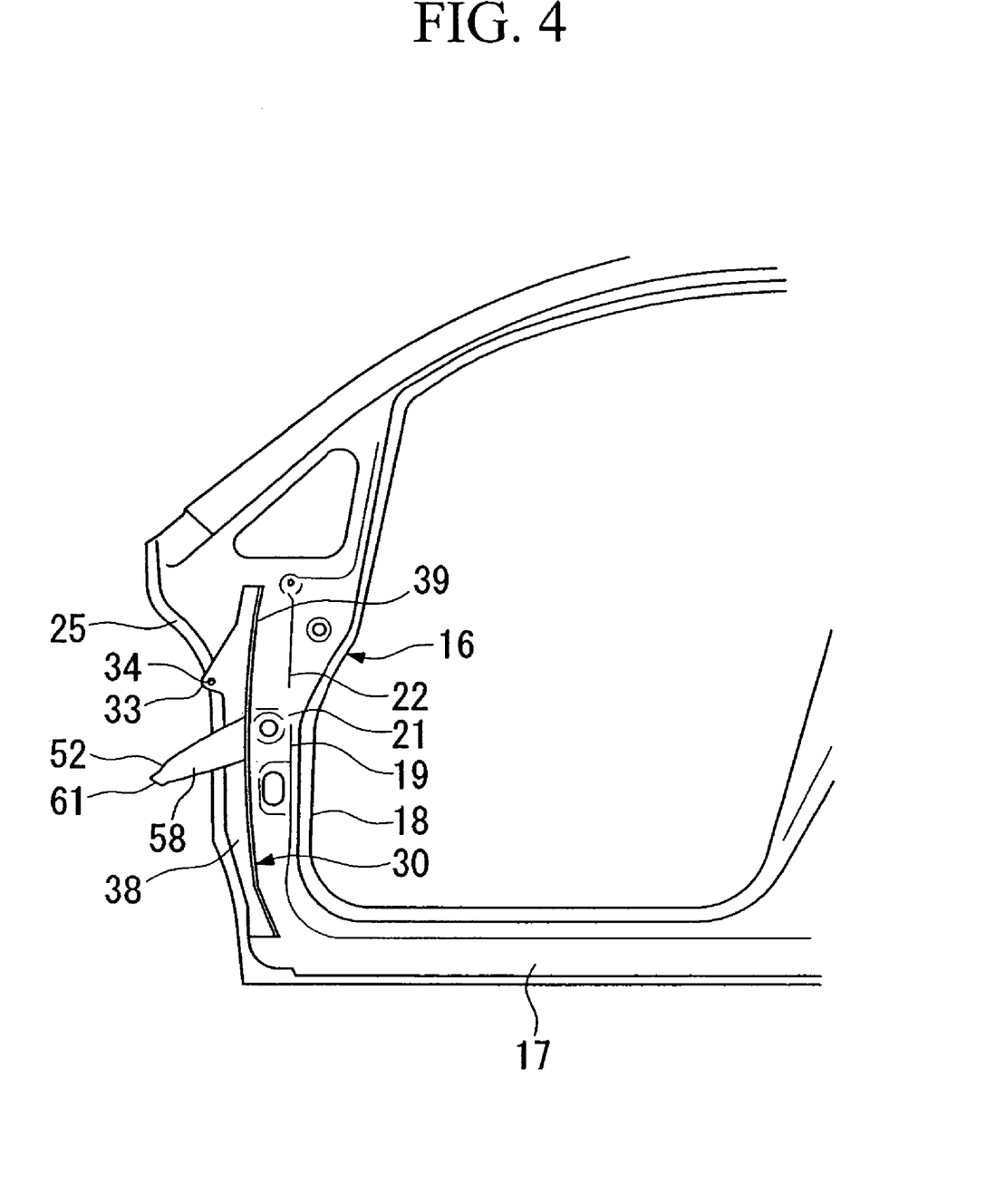
FIG. 4 is a side view showing the front fender structure of the present invention with its fender panel removed.
Figure 5:
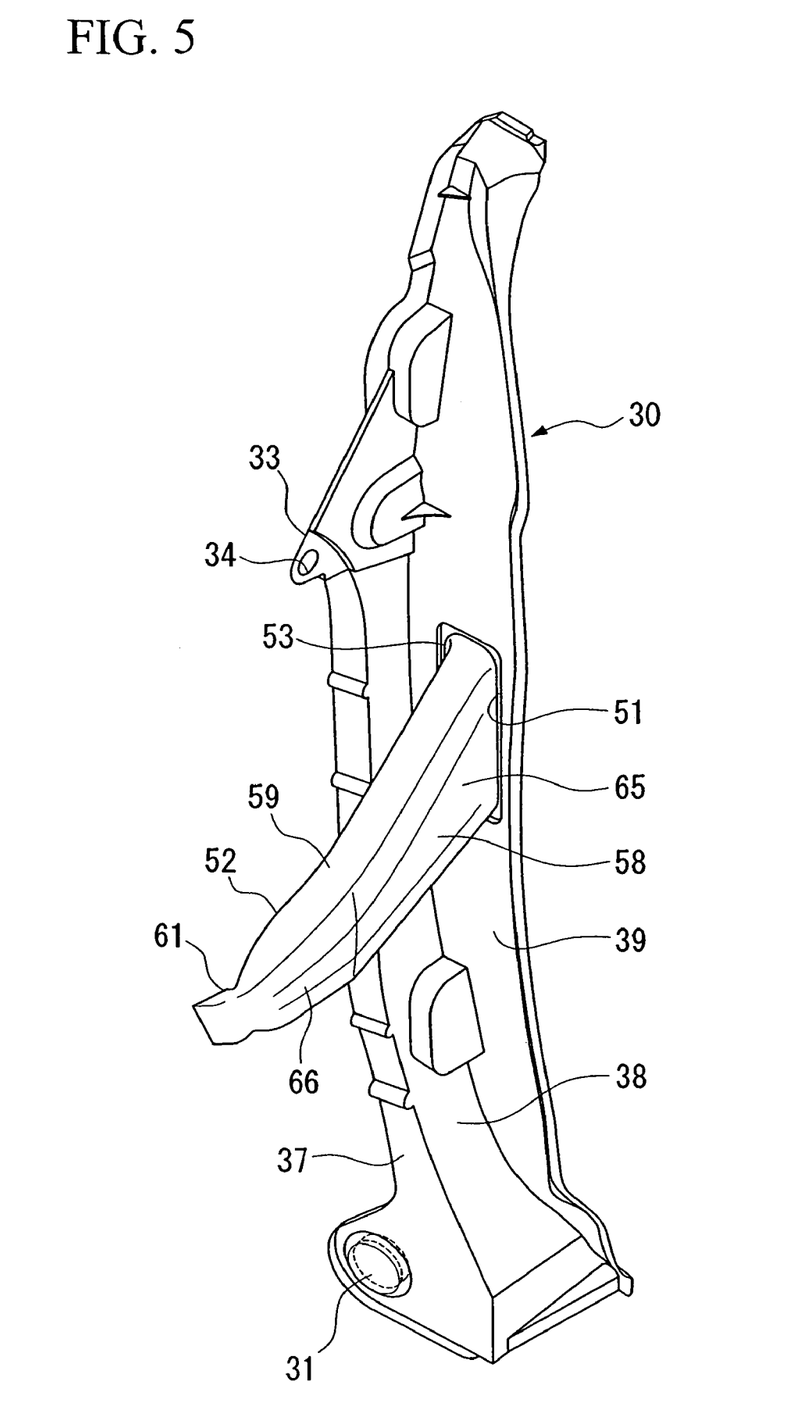
FIG. 5 is a perspective view showing an enclosure and an enclosure extension, which are used in the front fender structure of the present invention.

As shown in FIG. 2 and FIG. 4, an enclosure 30 made of synthetic resin, which is long in one direction, extends in the vertical direction between the side plate portion 22 of the outer panel 16 and the fender panel 15 so that the clearance therebetween is covered up. As shown in FIG. 5, the enclosure 30 has a front plate portion 37 orthogonal to the longitudinal direction and extending in the vertical direction. A plug 31 is attached to the lower part of the front plate portion 37. Also, a protrusion portion 33 which protrudes forward is provided on the upper part of the front plate portion 37, and an attaching hole 34 is formed in the protrusion portion 33.

Figure 6:
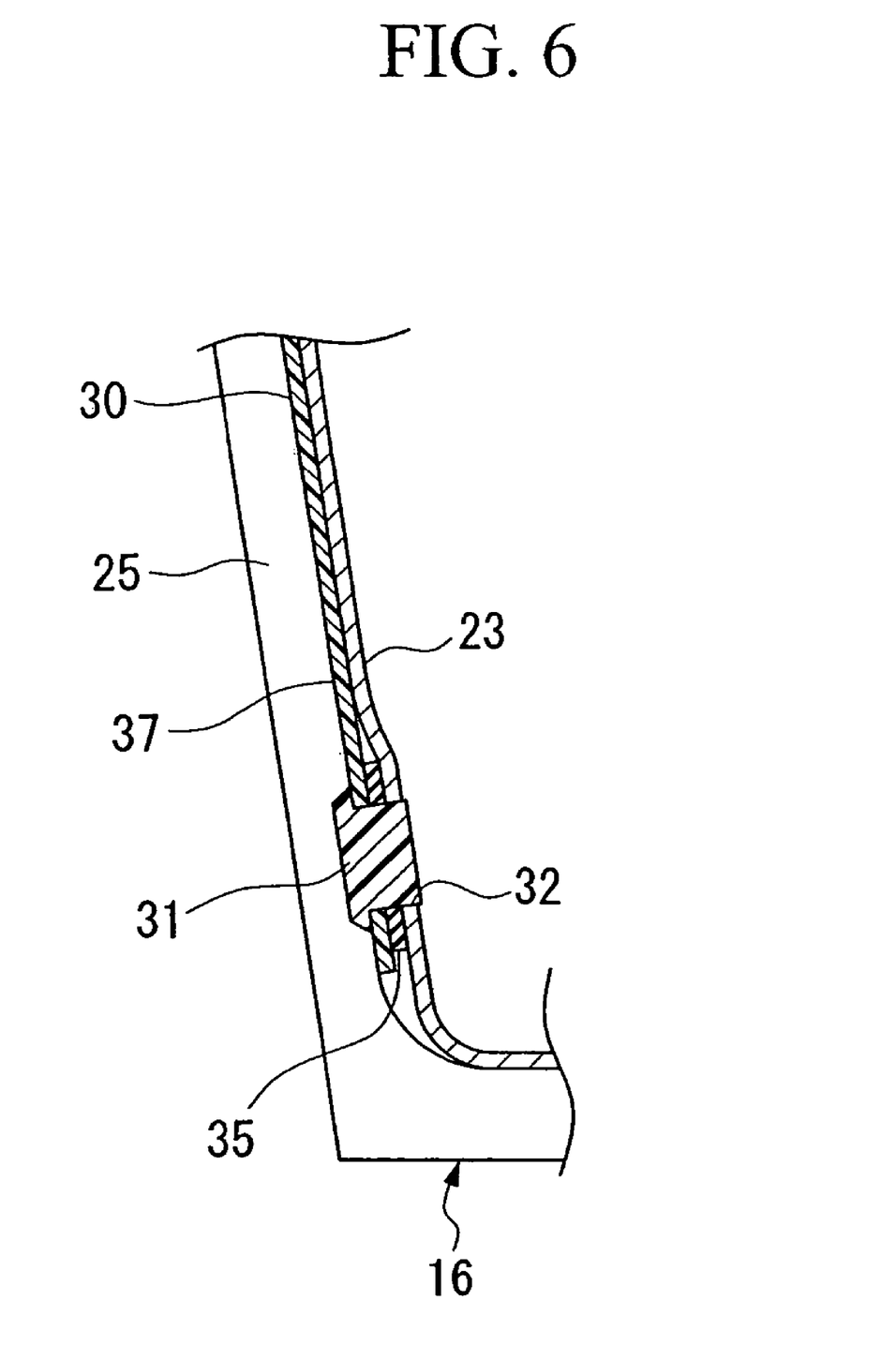
FIG. 6 is a sectional view showing an attaching portion at the lower part of an enclosure used in the front fender structure of the present invention.

As shown in FIG. 6, an attaching hole 32 is formed at the lower part of the front plate portion 23 of the outer panel 16, and the enclosure 30 is fixed at the outer panel 16 by the plug 31 being fitted into the attaching hole 32 of the outer panel 16. In addition, the enclosure 30 is fixed, via the attaching hole 34 of the protrusion portion 33, to the front wheel housing (not shown) connecting the wheel housing member 11 and the outer panel 16 to each other. A sealing member 35 is secured at the enclosure 30 side around the circumference of the attaching hole 32.

In a state where the enclosure 30 is attached to the outer panel 16, the front plate portion 37 of the enclosure 30 is brought into contact with the front face of the front plate portion 23 of the pillar structure 21. As shown in FIG. 3 through FIG. 5, the enclosure 30 is roughly shaped so as to include the front plate portion 37, side pate portion 38, and rear plate portion 39. The side plate portion 38 is long in the vertical direction, bent rearward from the end edge portion at the outer side in the vehicle width direction of the front plate portion 37 and extends to an intermediate position in the longitudinal direction of the side plate portion 22 along the outer side in the vehicle width direction of the side plate portion 22 of the outer panel 16. The rear plate portion 39 is also long in the vertical direction and bent to the outer side in the vehicle width direction from the rear end edge portion of the side plate portion 38.

The clearance between the side plate portion 22 of the outer panel 16 and the fender panel 15 is covered up mainly by the rear plate portion 39 of the enclosure 30, and the outer side in the vehicle width direction of the rear plate 39 is engaged with the fender panel 15.

In detail, as shown in FIG. 3, an inner flange portion 42 is formed, at the rear end edge portion of the fender panel 15 which becomes a parting portion of the front door 12. The inner flange portion 42 is folded and bent inward in the vehicle width direction, and is inclined so as to be positioned at a further front side inward in the vehicle width direction as the entirety. The inner flange portion 42 includes an inward folded portion 43, an intermediate plate portion 44, and an inner end plate portion 45. The inward folded portion 43 is folded and bent from the rear end edge of the fender panel 15 inward in the vehicle width direction, and is inclined so as to be positioned at a further front side inward in the vehicle width direction. The intermediate plate portion 44 is folded and bent further inward in the vehicle width direction from the inner end edge portion in the vehicle width direction of the inward folded portion 43, and is inclined so as to be positioned at a further rear side inward in the vehicle width direction. The inner end plate portion 45 is folded and bent further inward in the vehicle width direction from the inner end edge portion in the vehicle width direction of the intermediate plate portion 44.

An intermediate plate portion 48 and an outer end plate portion 49 are formed to the inner flange portion 42 at the outside in the vehicle width direction of the rear plate portion 39 of the enclosure 30. The intermediate plate portion 48 is bent so as to be positioned at a further front side outward in the vehicle width direction. The outer end plate portion 49 is bent so as to be positioned at a further rear side in the vehicle width direction at the outer end edge portion in the vehicle width direction of the intermediate plate portion 48.

Since the boundary portion between the inward folded portion 43 of the fender panel 15 which forms a protrusion portion and the intermediate plate portion 44 thereof is fitted to the boundary portion between the intermediate plate portion 48 of the enclosure 30 forming a recession portion and the outer end plate portion 49 thereof, the rear plate portion 39 of the enclosure 30 is engaged with the inner flange portion 26 of the fender panel 15.

Figure 7:
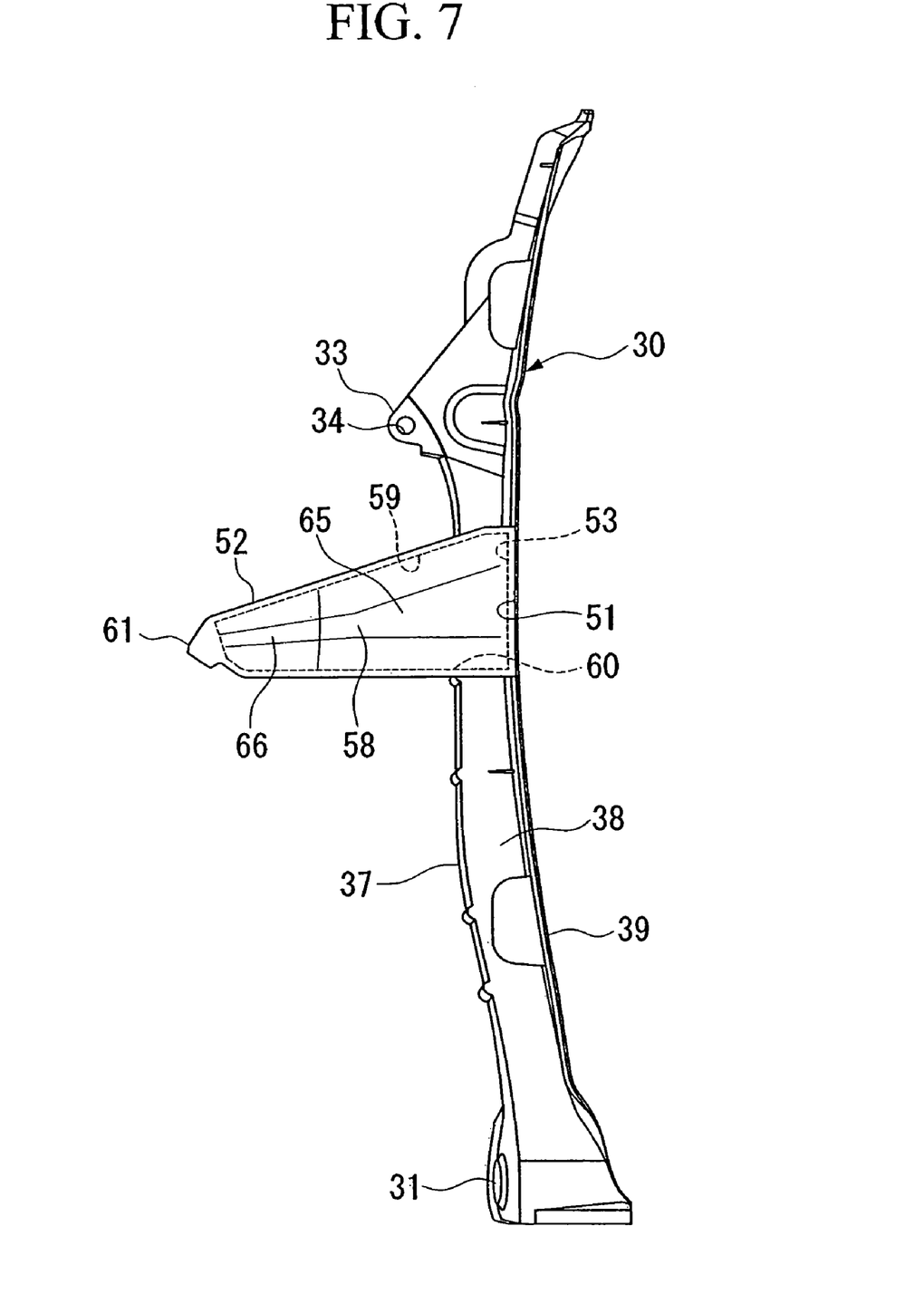
FIG. 7 is a side view showing an enclosure and an enclosure extension which are used in the front panel structure of the present invention.

In the embodiment, as shown in FIG. 5 and FIG. 7, an attaching seat portion 51 is formed at the intermediate part in the vertical direction of the rear plate portion 39 of the enclosure 30 and at the front side slightly upward from the central part of the rear plate portion 39, and an enclosure extension 52 is attached to the attaching seat portion 51. The enclosure extension 52 is made of synthetic resin and is shaped to be long in one direction so as to extend forward. An attaching plate portion 53 is provided in one end portion in the lengthwise direction of the enclosure extension 52, and an attaching hole 54 is formed at both upper and lower parts of the attaching plate portion 53 (only one-side hole is shown in FIG. 3). Likewise, an attaching hole 55 is formed at both upper and lower parts of the attaching seat portion 51 of the enclosure 30 (only one-side hole is shown in FIG. 3).

The enclosure extension 52 is fixed at the enclosure 30 by riveting rivets 56 into the attaching hole 54 and the attaching hole 55 with the attaching plate portion 53 brought into contact with the attaching seat portion 51 of the enclosure 30 and the attaching holes 54 and 55 aligned to each other.

As shown in FIG. 5 and FIG. 7, the enclosure extension 52 includes an outer plate portion 58, an upper plate portion 59, a lower plate portion 60, an attaching portion 61 and reinforcement plate portions 62 (shown in FIG. 3). In a state where the enclosure extension 52 is attached to the enclosure 30 as described above, the outer plate portion 58 extends so as to be inclined slightly forward from the outer end edge portion in the vehicle width direction of the attaching plate portion 53. The outer plate portion 58 is shaped so as to be tapered forward. The upper plate portion 59 is bent inward in the vehicle width direction from the upper end edge of the outer plate portion 58, and simultaneously is connected to the upper end edge portion of the attaching plate portion 53. The lower plate portion 60 is bent inward in the vehicle width direction from the lower end edge portion of the outer plate portion 58, and simultaneously is connected to the lower end edge portion of the attaching plate portion 53. The attaching portion 61 is provided at the front end portion of the outer plate portion 58, the upper plate portion 59 and the lower plate portion 60. Reinforcement plate portions 62 are formed inside in the vehicle width direction of the outer plate portion 58 so as to connect the outer plate portion 58, the upper plate portion 59 and the lower plate portion 60 to each other.

The outer plate portion 58 includes a base plate portion 65 and a fender panel surface reinforcement plate portion (fender panel surface reinforcement portion) 66. The base plate portion 65 extends while being inclined so as to be positioned at a further outer side in the vehicle width direction toward the front side from the attaching plate portion 53. The fender panel surface reinforcement plate portion 66 is close to the inner surface 67 of the fender panel 15 and extends from the front end portion of the base plate portion 65 along the inner surface 67 of the fender panel 15. As shown in FIG. 3, the fender panel surface reinforcement plate portion 66 is disposed in parallel to the inner surface 67 of the fender panel 15, and is not in contact with the fender panel 15 unless the fender panel 15 is deformed. The gap between the fender panel surface reinforcement plate portion 66 and the fender panel 15 is established so that the fender panel 15 is brought into contact with the fender panel surface reinforcement plate portion 66 with slight deformation of the fender panel 15.

As shown in FIG. 2, the attaching portion 61 at the front end of the enclosure extension 52 is attached to the upper part of an arcuate wheel arch edge portion 68 of the fender panel 15, whereby the enclosure extension 52 extends from the enclosure 30 toward the upper part of the wheel arch edge portion 68, and the extended tip end is attached to the upper part of the wheel arch edge portion 68. Also, the fender panel surface reinforcement plate portion 66 is disposed at the inner side in the vehicle width direction of the rear part at the upper portion of the wheel arch edge portion 68, which is roughly flat and has a wide area.

As shown in FIG. 3, an inner flange portion 69 is formed at the wheel arch edge portion 68 of the fender panel 15, which is inclined so as to be positioned at a further outer side in the radius direction of the wheel arch edge portion inward in the vehicle width direction, and is folded and bent inward in the vehicle width direction. A fitting hole (engagement portion) 70 is formed at the upper part of the inner flange portion 69, in detail, at a slightly lower rear part than the upper end portion thereof.

In contrast, opposite the enclosure 30, the attaching portion 61 of the enclosure extension 52 includes an annular flat attaching surface 71 and a boss portion (engagement portion) 72 which protrudes in the vertical direction from the attaching surface 71 at the inner side of the attaching surface 71. By bringing the attaching surface 71 at the circumference of the boss portion 72 into the outside surface in the vehicle width direction of the inner flange portion 69 after fitting the boss portion into the fitting hole 70 from the outer side in the vehicle width direction, the enclosure extension 52 is positioned at the inner flange portion 69 of the fender panel 15.

At the attaching portion 61 secured at the extended tip end of the enclosure extension 52, an inner panel 75 made of synthetic resin, which is disposed inward in the vehicle width direction of the fender panel 15, is fastened along with the fender panel 15.

An outer flange portion 76 which is brought into contact with the side surface in the vehicle width direction of the inner flange portion 69 of the fender panel 15 is formed at the outer end edge portion in the vehicle width direction of the inner fender panel 75. A fitting hole 77 is formed at the outer flange portion 76, which carries out positioning of the inner fender panel 75 with respect to the enclosure extension 52 by fitting the boss portion 72 of the enclosure extension 52. The boss portion 72 which protrudes from the fitting hole 70 is fitted in the fitting hole 77 of the inner fender panel 75. A screw 80 is screwed into the boss portion 72 from the inner side in the vehicle width direction of the outer flange portion 76 of the inner fender panel 75 with a washer 79 interposed therebetween. Therefore, the inner flange portion 69 of the fender panel 15, the outer flange portion 76 of the inner fender panel 75 and the washer 79 thereof are sandwiched between the screw 80 and the attaching surface 71 of the attaching portion 61, and the inner fender panel 75 and fender panel 15 are fastened to the attaching portion 61 having the boss portion 72.

Further, with respect to assembling sequence, the enclosure 30 to which the enclosure extension 52 is attached in advance is inserted between the front fender panel 15 and the outer panel 16 from the front side, which are attached to the vehicle body 10 side prior thereto, and is fixed at the outer panel 16 and the front wheel housing (not shown). Continuously, the boss portion 72 of the enclosure extension 52 extending forward is fitted into the fitting hole 70 of the inner flange portion 69 of the front fender panel 15. Then, the boss portion 72 which protrudes forward so as to be able to be observed through the fitting hole 70 is fitted into the fitting hole 77 of the outer flange portion 76 of the inner fender panel 75, wherein the inner fender panel 75 is provisionally held. Further continuously, the screw 80 to which the washer 79 is attached is screwed in the boss portion 72.

According to the embodiment described above, the enclosure extension 52 extends from the enclosure 30 toward the upper part of the wheel arch edge portion 68 of the fender panel 15. Therefore, even if the rearward portion at the upper part of the wheel arch edge portion 68, which is roughly flat and has a wide area, of the fender panel 15 is pushed by hand by a person, the pushed portion is brought into contact with the fender panel surface reinforcement portion plate 66 along the inner surface 67 of the fender panel 15, whereby it is possible to prevent the rearward portion at the upper part of the wheel arch edge portion 68 from being deformed. Accordingly, even if the thickness of the fender panel 15 is made thin, it is possible to secure surface rigidity of the rearward portion at the upper part of the wheel arch edge portion 68, which is roughly flat and has a wide area, of the fender panel 15. In addition, in a case where the planar rigidity is reinforced by attaching a patch to the fender panel 15, the attaching work is normally complicated. However, such a problem does not occur in the embodiment.

In addition, according to the embodiment, since the fender panel 15 is fastened together with the inner fender panel 75 at the attaching portion 61 of the extended tip end portion of the enclosure extension 52, it is possible to collectively fasten the extended tip end portion of the enclosure extension 52, the fender panel 15 and the inner fender panel 75 at one time.

Further, according to the embodiment, since the boss portion 72 of the extended tip end portion of the enclosure extension 52 is fitted in the fitting hole 70 of the fender panel 15, the boss portion 72 is positioned with respect to the fender panel 15, and it is exposed from the fender panel 15, accordingly it is possible to easily carry out fastening of the inner fender panel 75 at the attaching portion 61 having the boss portion 72, which is carried out thereafter. Therefore, collective fastening of the attaching portion 61 of the extended tip end portion of the enclosure extension 52, the fender panel 15 and the inner fender panel 75 can be further easily carried out. Furthermore, by adjusting the height of the boss portion 72, it is possible to simply engage the boss portion 72 with the other components such as the inner fender panel 75 without changing the shape of the fender panel 15.

The enclosure 30 and the enclosure extension 52 may be integrated together. In particular, according to the embodiment, since the enclosure 30 and the enclosure extension 52 are separate from the fender panel 15, unevenness of the respective attaching components can be absorbed. Therefore, assembling of components can be facilitated, the degree of freedom in shape can be increased, and simultaneously it is possible to lighten the weight. In addition, since the respective components are separate from each other, packaging can be improved, it is possible to improve the packaging thereof, and to achieve efficiency in transportation and storage. Further, it is possible to change any one of the components or select attachment or non-attachment thereof in accordance with a difference in the grade of the vehicle.

Furthermore, although the material is not limited, according to the embodiment, the enclosure 30 and the enclosure extension 52 may be made of synthetic resin. Therefore, no rust occurs, and there is no need to provide paint thereon. Accordingly, production costs can be reduced. Also, since both the components are made of synthetic resin, it is possible to prevent rust from arising in the outer panel 16 and the fender panel 15 which are brought into contact with the components.

Figure 8:
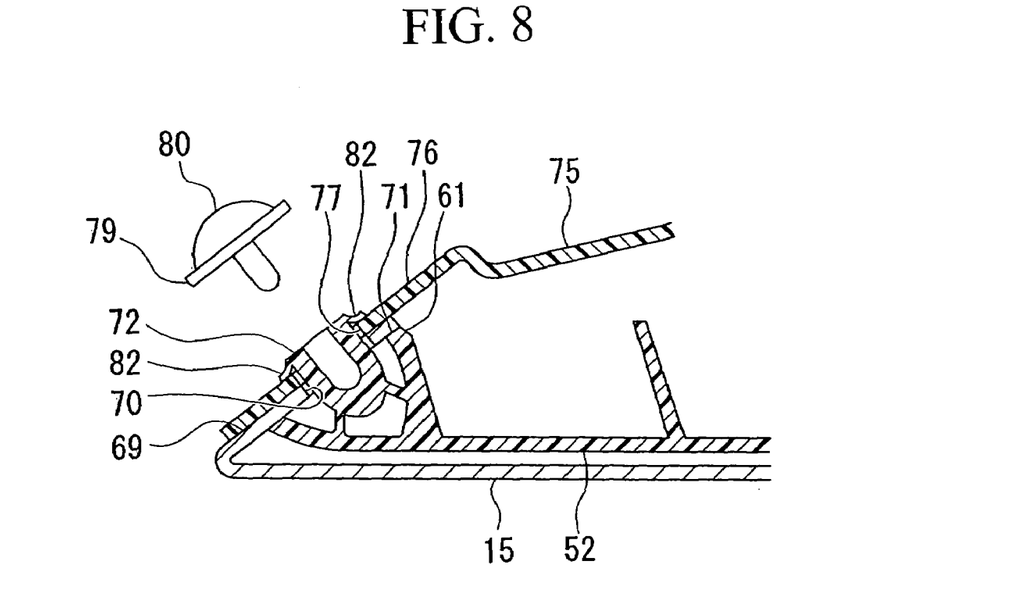
FIG. 8 is a sectional view showing a modified version of a linkage portion of a fender panel, an enclosure extension and an inner fender panel of the front fender structure of the present invention.

Also, as shown in FIG. 8, the tip end side of the boss portion 72 of the enclosure extension 52 may be made thin, and a flexible claw portion 82 which can pass through the fitting holes 70 and 77 and widen after passing therethrough may be formed. Since the claw portion 82 is caught at the inner fender panel 75 when screwing in the screw 80 if such a claw portion 82 is formed, the boss portion 72 is prevented from breaking off from the fitting holes 70 and 77. Therefore, efficiency of the assembling work can be improved.

Figure 9:
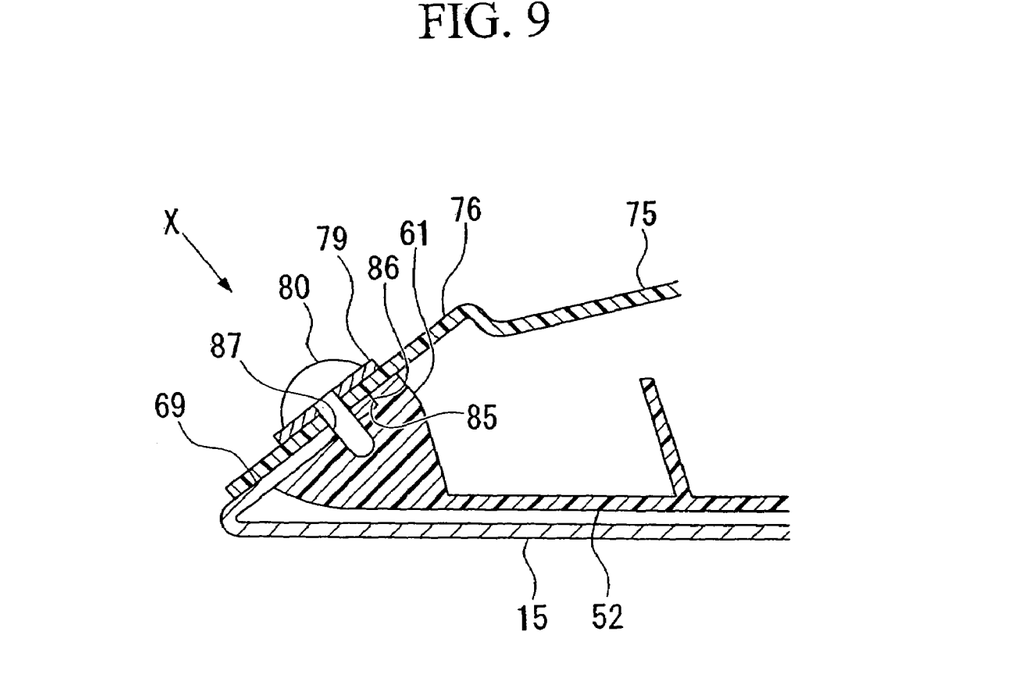
FIG. 9 is a sectional view showing another modified version of a linkage portion of a fender panel, an enclosure extension and an inner fender panel of the front fender structure of the present invention.
Figure 10:
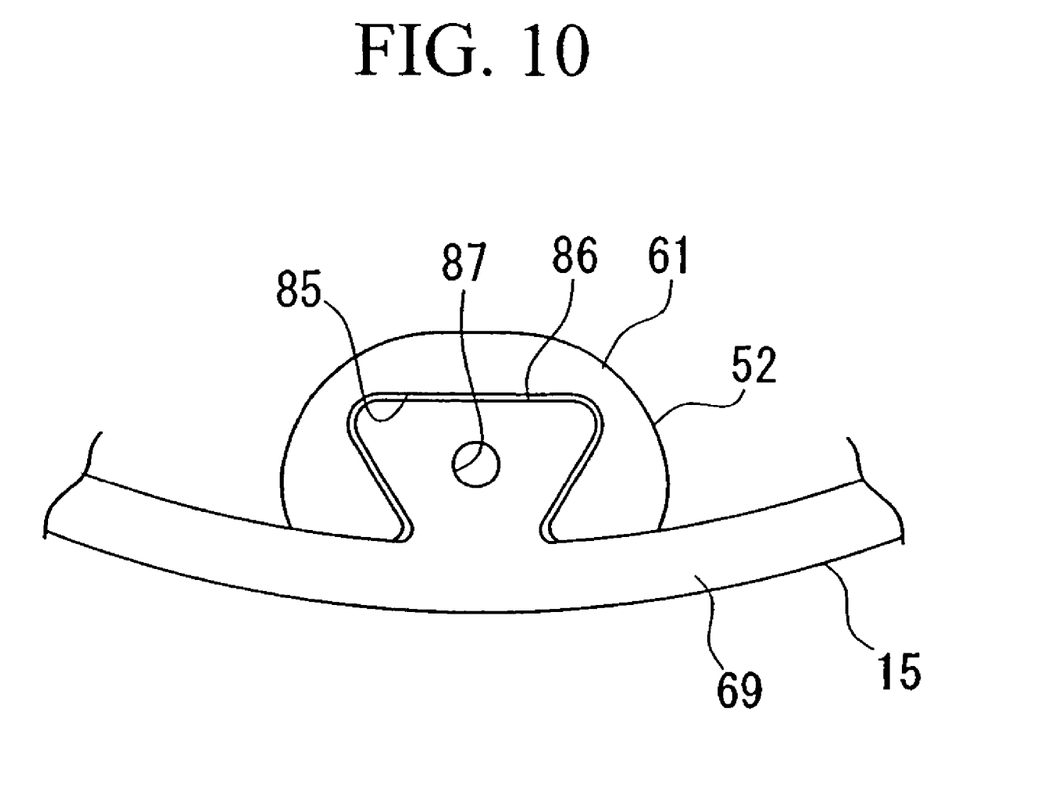
FIG. 10 is a view showing the linkage portion of the fender panel and the enclosure extension of the front fender structure of the present invention when being observed in the X direction in FIG. 9.

In addition, because such a structure is employed, by which the attaching portion 61 of the enclosure extension 52 is positioned along the direction facing the plane of the inner flange portion 69 at the inner flange portion 69 of the fender panel 15, a structure other than the boss portion 72 and the fitting hole 70 described above may be employed. For example, as shown in FIG. 9 and FIG. 10, a recess (engagement portion) 85 is formed so that it is recessed along the tip end surface and one side thereof widens is and is formed at the tip end surface of the attaching portion 61 of the enclosure extension 52, and at the same time, a protrusion portion 86 which protrudes along the plane direction of the inner flange portion 69 and further widens toward the protrusion tip end side is formed at the inner flange portion 69 of the fender panel 15, wherein these components may be engaged with each other. In this case, an attaching hole 87 for the screw 80 is formed in the protrusion portion 86.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A front fender structure comprising:
   an enclosure extending vertically and being disposed between a fender panel and an outer panel, said outer panel forming a front pillar;
   an enclosure extension that extends from the enclosure and toward the upper part of a wheel arch edge portion of the fender panel; and
   a fender panel surface reinforcement portion provided by the enclosure extension, said fender panel surface reinforcement portion being disposed adjacent the inner surface of the fender panel and serving to limit deformation of said fender panel.

2. The front fender structure according to claim 1, further comprising an inner fender panel, said inner fender panel and said fender panel being fastened to the enclosure extension at an extended tip end portion of the enclosure extension.

3. The front fender structure according to claim 2, further comprising an engagement portion, said engagement portion being engaged with the extended tip end portion of the enclosure extension and a flange portion of the fender panel.

4. The front fender structure according to claim 3, wherein said engagement portion includes a fitting hole that is formed at the flange portion of the fender panel;
   an attaching portion is formed at the extended tip end portion of the enclosure extension;
   the attaching portion includes a boss portion, said boss portion being fitted in the fitting hole; and
   the inner fender panel is fastened to the attaching portion.

5. The front fender structure according to claim 1, wherein the enclosure extension extends between and interconnects the enclosure and the upper part of the fender panel wheel arch edge portion.

6. The front fender structure according to claim 5, further comprising an inner fender panel, said inner fender panel and said fender panel being fastened to the enclosure extension at an extended tip end portion of the enclosure extension.

7. The front fender structure according to claim 6, further comprising an engagement portion, said engagement portion being engaged with the extended tip end portion of the enclosure extension and a flange portion of the fender panel.

8. The front fender structure according to claim 7, wherein said engagement portion includes a fitting hole that is formed at the flange portion of the fender panel;
   an attaching portion is formed at the extended tip end portion of the enclosure extension;
   the attaching portion includes a boss portion, said boss portion being fitted in the fitting hole; and
   the inner fender panel is fastened to the attaching portion.

* * * * *